United States Patent Office 3,560,185
Patented Feb. 2, 1971

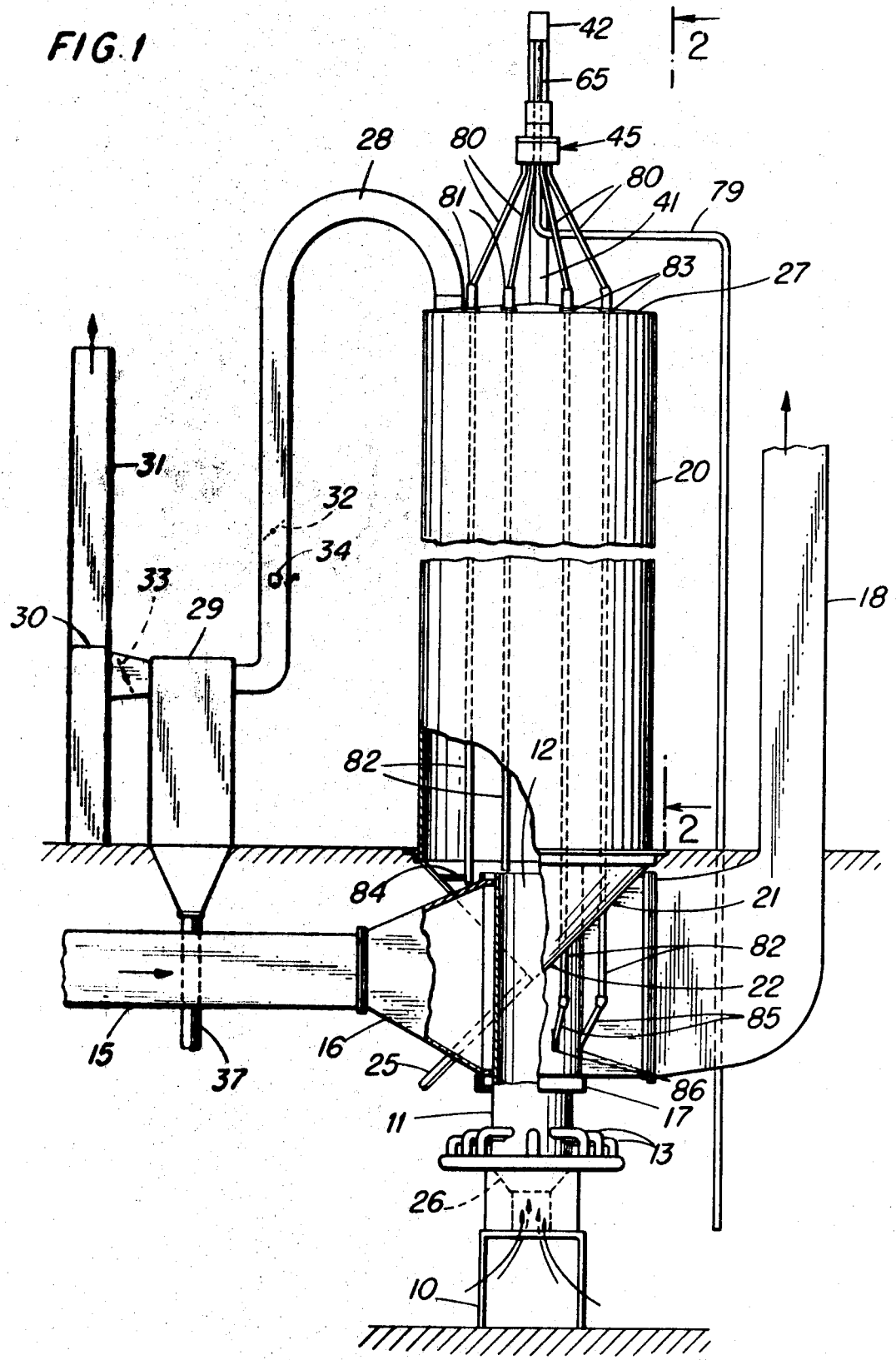

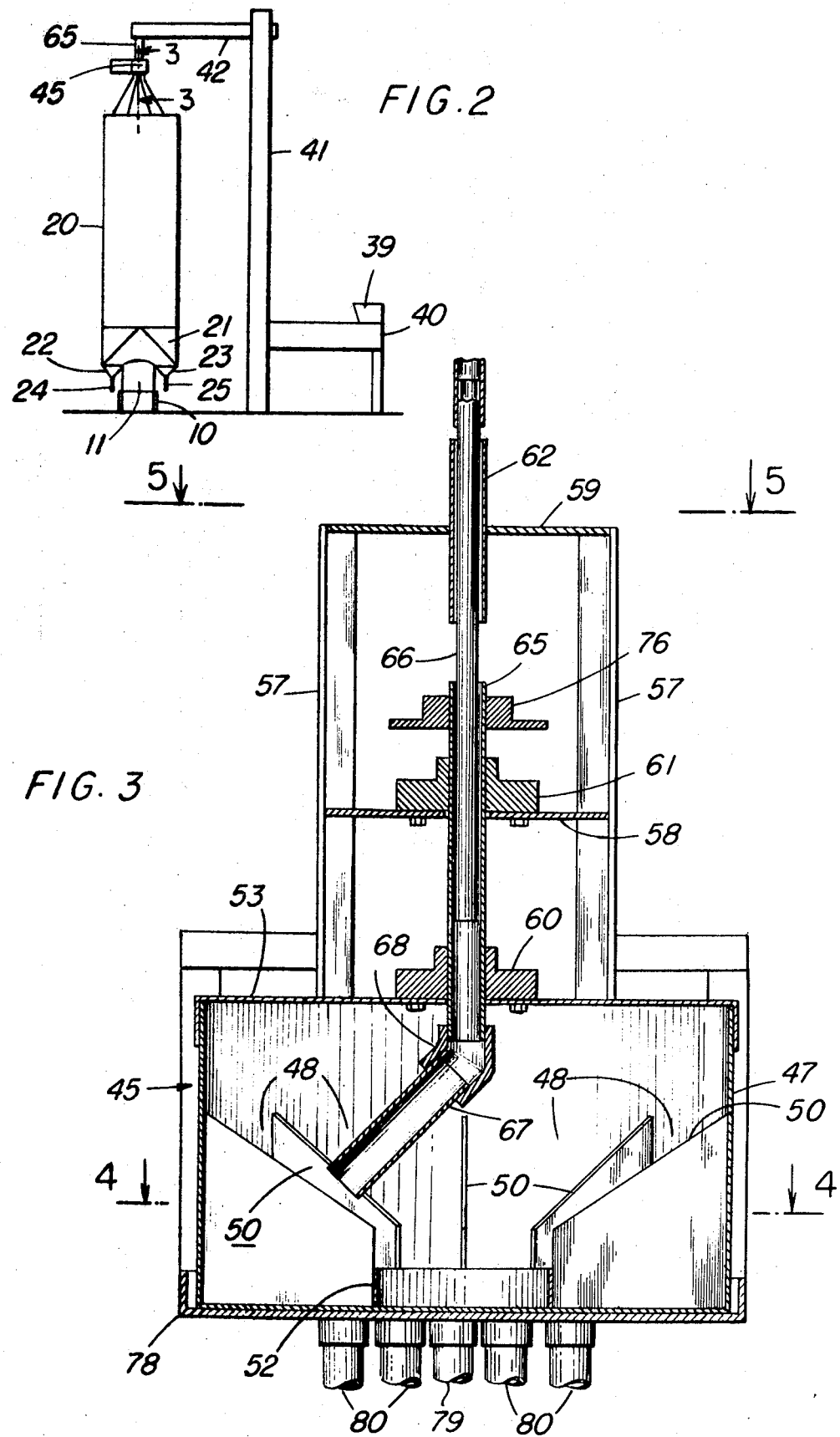

3,560,185
APPARATUS FOR FEEDING VITREOUS MATERIAL
Arthur G. Nylander, Passaic, N.J., assignor to Potter Bros. Inc., Carlstadt, N.J., a corporation of New York
Filed Mar. 11, 1968, Ser. No. 712,293
Int. Cl. C03b 19/10
U.S. Cl. 65—142
13 Claims

ABSTRACT OF THE DISCLOSURE

An apparatus for evenly distributing crushed glass particles among a plurality of flow paths leading to the draft tube of a bead furnace. The particles are directed through a single feed conduit having a laterally extending portion which is positioned above a receptacle containing an annular array of bins. These bins are respectively connected to the infeed ends of the flow paths. The feed conduit is continuously rotated at a uniform rate to successively position the laterally extending portion over each of the bins and thereby evenly distribute the particles among the flow paths.

BACKGROUND OF THE INVENTION

The present invention, while applicable generally to the distribution of particles of vitreous material among a plurality of flow paths, is particularly suited for use in the production of glass beads. As is well known, glass beads are commonly made by introducing crushed glass particles into a vertically disposed draft tube. The tube is open at its upper end and is provided with a series of burners adjacent its lower end which provide a source of heat in the form of a well distributed gas flame. The particles are carried upwardly by the combustion gases into an expansion chamber ar stack mounted above the draft tube. During their upward movement, the particles become soft and are shaped by surface tension into a substantially spherical configuration to form glass beads. For a more detailed discussion of representative bead manufacturing systems of this type, reference may be had, for example, to U.S. Pat. 2,619,776, granted Dec. 2, 1952, to Rudolph H. Potters and to U.S. Pat. 2,945,326, granted July 19, 1960, to Thomas K. Wood.

One of the more common uses for glass beads produced by systems of the foregoing type is to provide a reflecting surface. The beads are employed in lane marking for highways, for road and advertising signs, motion-picture screens, etc. Other uses for the beads include applications in which their reflecting properties are of little moment, as in cases in which the beads serve as fillers for plastic materials or are incorporated in various electrical devices. The diameter of the beads may vary widely and illustratively ranges from about .125 inch down to 25 microns.

Heretofore, difficulties have been encountered in the manufacture of glass beads and similar products from a supply of crushed particles. In the feeding of the particles to the source of heat within the draft tube, for example, it is important that the particles be discharged uniformly within the tube and at precise locations relative to the individual burners. In systems of the type described in the foregoing patents, only a single flow path was provided for conveying the particles to the tube. One disadvantage of this arrangement was that any substantial misalignment between the discharge end of the flow path and the burners detracted from the overall efficiency of the system. Attempts to alleviate these difficulties by providing a plurality of flow paths heretofore proved difficult, among other reasons, because of problems incident to the need for evenly distributing the incoming paticles among the several paths.

SUMMARY

One general object of this invention, therefore, is to provide apparatus for feeding particles of glass or other vitreous material to a source of heat along a plurality of paths.

Another object of this invention is to provide apparatus for producing glass beads wherein the uniformity and precision with which the crushed glass particles are introduced into the bead furnace are substantially improved.

A further object of this invention is to provide apparatus of the character indicated in which the particles of vitreous material are evenly distributed among the several paths.

Still another object of this invention is to provide new and improved apparatus for manufacturing glass beads that is economical and thoroughly reliable in operation.

In one illustrative embodiment of the invention, there is provided a source of heat which is disposed within the vertical draft tube of a bead furnace. A plurality of upstanding conduits are positioned with their lower ends within the draft tube immediately above the source of heat and in equi-distant relationship therewith. The upper ends of the conduits communicate with a receptacle which is continuously supplied with crushed glass particles. The particles flow downwardly through each of the conduits and are discharged into the draft tube immediately above the source of heat. The combustion gases within the tube propel the particles in an upward direction, and the particles become soft and are shaped by surface tension into glass beads.

In accordance with one feature of the invention, there is provided a single feed conduit leading from the supply of particles to the receptacle. This conduit is moved within the receptacle to successively distribute the incoming particles among the inlet ends of the upstanding conduits. The particles flow through the latter conduits along a plurality of paths and are discharged at precise locations adjacent the source of heat.

In accordance with another feature of the invention, in certain important embodiments, the single feed conduit is rotated about a vertical axis at a uniform rate and is provided with a laterally extending portion in juxtapostion with the inlet ends of the upstanding conduits. As the feed conduit rotates, crushed particles are successively deposited in each of the inlet ends. With this arrangement, there is provided an extremely even distribution of the crushed particles with respect to the source of heat.

In accordance with another feature of several advantageous embodiments of the invention, the receptacle for receiving the crushed particles from the single feed conduit is divided into a plurality of bins, one for each of the upstanding conduits. These bins are supported in an annular array and in some cases cooperate with unique overflow means for preventing the excessive build-up of particles within the bins.

BRIEF DESCRIPTION OF THE DRAWINGS

The present invention, as well as further objects and features thereof, will be understood more clearly and fully from the following description of a preferred embodiment, when read with reference to the accompanying drawings, in which:

FIG. 1 is a diagrammatic view, partly broken away and in section, of apparatus for producing glass beads which includes an arrangement for feeding crushed glass particles in accordance with an illustrative embodiment of the invention;

FIG. 2 is a schematic side view of the apparatus, on a reduced scale, as seen from the line 2—2 in FIG. 1;

FIG. 3 is an enlarged fragmentary sectional view taken along line 3—3 in FIG. 2;

DESCRIPTION OF A PREFERRED EMBODIMENT

Figure 4:
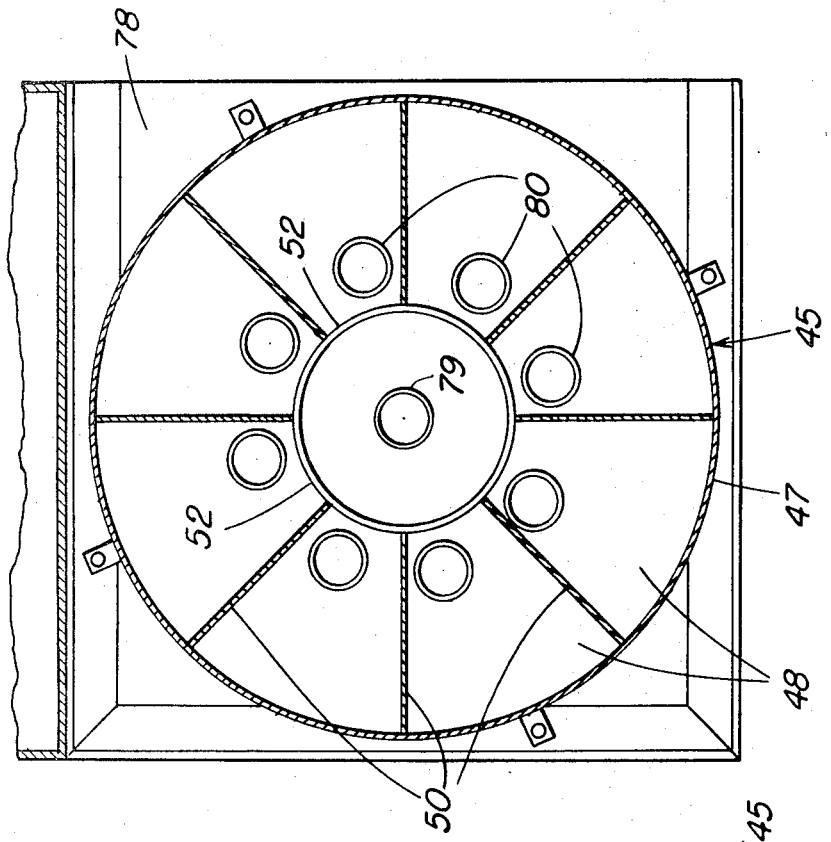
FIG. 4 is a sectional view taken along the line 4—4 in FIG. 3, with certain portions shown broken away.

Referring to FIGS. 1 and 2 of the drawings, there is shown a glass bead making furnace having a controlled suction draft which is similar in some respects to that disclosed in Wood U.S. Pat. 2,945,326 referred to heretofore. The furnace rests on a suitable support 10 and includes an upstanding, generally cylindrical draft tube 11 which is open at its upper end 12. A series of gas burners 13 project into the tube 11 adjacent its lower end and are equally distributed around the periphery of the tube to provide a source of heat therein.

The exterior surface of the draft tube 11 is cooled through the use of a cooling duct indicated generally at 15. The duct 15 is supplied with a stream of air and is connected through an expanded portion 16 to a cylindrical plenum chamber 17. This chamber surrounds the draft tube 11 in spaced relationship therewith and exhausts into a vertical stack 18.

Positioned above the open upper end 12 of the draft tube 11 is an enlarged expansion chamber 20. The chamber 20 is of substantially enclosed, cylindrical configuration and is provided at its lower end with a collection chamber 21. This latter chamber surrounds the upper portion of the draft tube 11 in coaxial relationship therewith and includes two discharge sections 22 and 23 (FIG. 2). The sections 22 and 23 resemble inverted pyramids and are respectively provided with outfeed conduits 24 and 25 leading to suitable collecting bins (not shown).

The draft within the tube 11 and the expansion chamber 20 is carefully regulated to control the velocity of the combustion gases therein. As more fully described in the above-identified Wood Pat. 2,945,326, a draft regulator 26 is positioned at the lower end of the tube 11 and is suitably mounted on the support 10. The upper end of the expansion chamber 20 is substantially closed by a cover 27 having an opening which communicates with a duct 28. This duct extends in a downward direction through a separating device 29 to a suction fan 30 which exhausts upwardly through a stack 31 open to the atmosphere. Two dampers 32 and 33 are disposed within the duct 28 on opposite sides of the separator 29, and the conduit includes an adjustable opening 34 to provide an additional draft control. The fan 30 draws air into the draft tube 11 and the expansion chamber 20 through the draft regulator 26 and exhausts the combustion gases through the duct 28, the separator 29 and the stack 31.

Crushed glass particles are continuously fed to the draft tube 11, in a manner that will become more fully apparent hereinafter, and are entrained with the upward flow of hot gases within the tube. During their upward movement, the particles become heated to a temperature sufficient to cause the softening and shaping thereof by surface tension into spherical form. The particles are carried upwardly into the expansion chamber 20, where they cool and solidify in the form of glass beads. A substantial percentage of the larger beads falls through the relatively quiescent lateral zones of the chamber 20 to the collection chamber 21. These beads drop into the two discharge sections 22 and 23 and pass outwardly through the outfeed conduits 24 and 25, where they are collected for grading and packaging. The smaller solidified beads continue their upward movement with the combustion gases in the chamber 20 and pass through the cover 27 into the duct 28. The beads are separated from the entraining gases in the separating device 29 and are discharged through an outfeed conduit 37 into suitable containers (not shown).

The structure described thus far is merely illustrative of a known combination of bead making components. It will be readily apparent that in any such combination care should be taken to insure that the crushed glass particles are fed to the draft tube 11 at a carefully controlled rate. The particles should be discharged uniformly within the tube and in predetermined spacial relationship relative to the burners 13 or other heat source therein.

In the illustrated embodiment of the invention, these results are achieved by equally dividing the incoming particles among a plurality of flow paths and by discharging particles from each of these paths into the draft tube immediately above the source of heat. As shown schematically in FIG. 2, the particles are introduced into the infeed hopper 39 of a feeding unit 40. The unit 40 is of conventional construction and illustratively may comprise a gravimetric feeder available commercially from Wallace & Tiernan, Inc., 25 Main St., Belleville, N.J., and identified as Series G-100. As will be understood, the unit 40 is arranged to deliver a carefully measured quantity by weight of crushed glass particles per unit time.

The measured quantity of particles from the feeding unit 40 is continuously supplied at a uniform rate to an elevator 41. The elevator 41 carries the particles upwardly to a position above the expansion chamber 20. The particles are then advanced horizontally by a helical screw conveyor 42.

Figure 5:
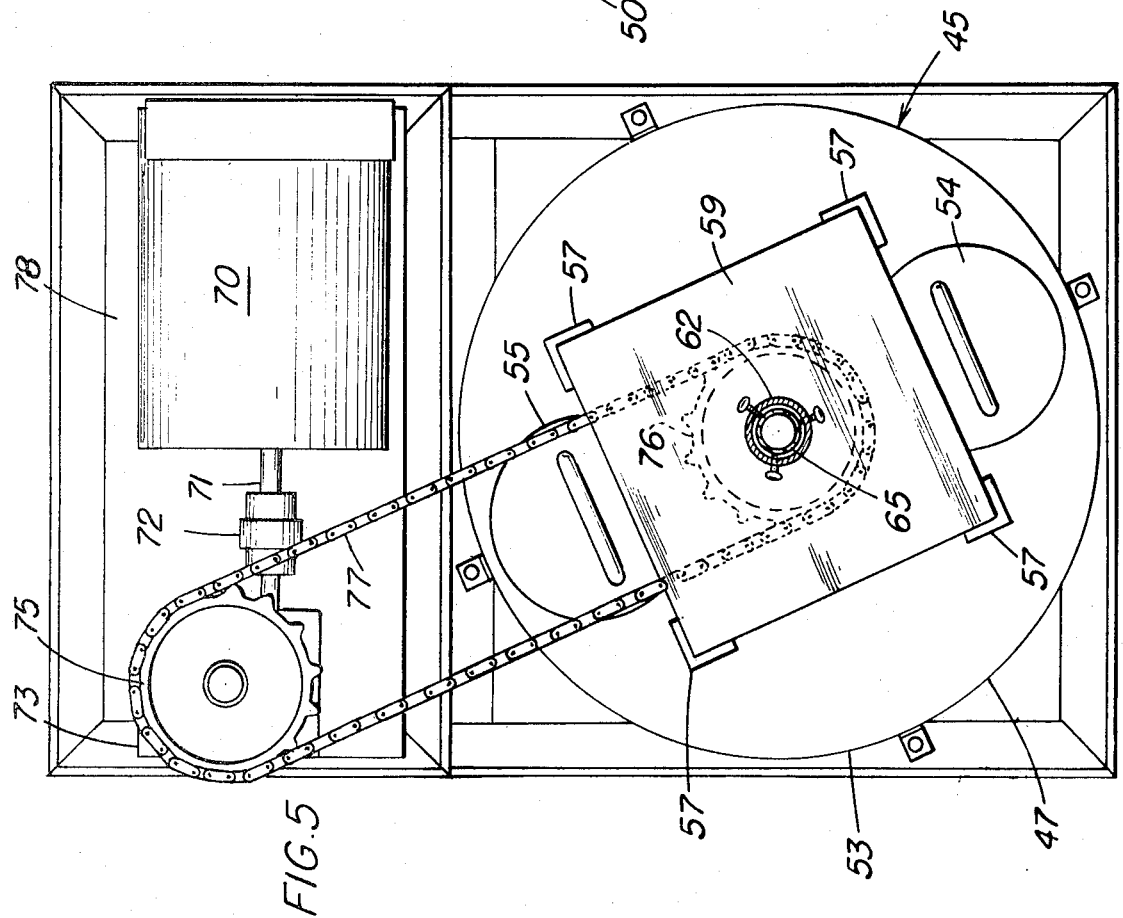
FIG. 5 is a sectional view taken generally along the line 5—5 in FIG. 3.

The crushed particles are fed by the screw conveyor 42 to a distributing unit indicated generally at 45. As best shown in FIGS. 3–5, the unit 45 includes a cylindrical chamber or receptacle 47 which is divided into eight bins 48 by a series of radially extending partitions 50. The bins 48 are supported in annular array within the receptacle 47 and are separated from the central portion of the receptacle by a sleeve member 52. The axis of the array of bins extends vertically and is coaxial with the extension chamber 20 and the draft tube 11. The receptacle 47 is normally closed by a plate 53. This plate is provided with two covers 54 and 55 which permit access to the bins.

Extending upwardly above the receptacle 47 are four angle legs 57. The legs 57 are suitably affixed to the plate 53 and carry an intermediate plate 58 and a top plate 59. The lower plate 53 and the intermediate plate 58 respectively support flange-type bearings 60 and 61, while the top plate 59 supports a sleeve 62.

A single feed conduit 65 is rotatably positioned within the bearings 60 and 61. The conduit 65 extends vertically in coaxial relationship with the annular array of bins 48, the expansion chamber 20 and the draft tube 11. The upper end of the conduit 65 accommodates a stationary extension 66 leading through the sleeve 62 to the screw conveyor 42, while the lower end of the conduit is provided with a laterally extending portion 67. The portion 67 meets the remaining portion of the conduit at a forty-five degree angle and is connected thereto by an elbow 68. With this arrangement, the lower end of the portion 67 is positioned immediately above the annular array of bins 48 in close juxtaposition therewith.

The feed conduit 65 is continuously rotated at a uniform rate by an electric motor 70 (FIG. 5). The motor 70 is supported adjacent one side of the receptacle 47 and includes an output shaft 71 which is connected by a flexible coupling 72 to a speed reducing mechanism 73. A sprocket 75 is driven by the mechanism 73 and is connected to a second sprocket 76 by a chain 77. The sprocket 76 is rigidly secured to the feed conduit 65 intermediate the plates 58 and 59.

The receptacle 47, the motor 70 and the speed reducing mechanism 73 are mounted on a horizontal rectangular plate 78. Extending downwardly from the plate 78 is a centrally located pipe 79 and eight angularly disposed pipes 80. The upper end of the pipe 79 communicates with the central portion of the receptacle 47, while the upper ends of the pipes 80 respectively communicate with the bins 48. As best shown in FIG. 1, the pipe 79 leads from the receptacle 47 to a position adjacent the draft tube 11 at the lower portion of the furnace. The pipes 80 are connected by elbows 81 at their lower ends to eight upstanding conduits 82. These conduits are supported by mounting members 83 and extend for an appreciable distance within the expansion chamber 20 from the cover 27 to the lower portion of the tube 11. A grating 84 is positioned across the open bottom of the chamber 20, and this grating serves to maintain the conduits 82 in spaced relationship with each other and with the inner wall of the chamber. The lower ends of the conduits 82 protrude through the collection chamber 21 and respectively communicate with eight angularly disposed pipes 85. The free or discharge ends of the pipes 85 extend through corresponding openings 86 in the draft tube 11 and are located in a circular pattern immediately above the burners 13 and in equi-distant relationship therewith. The arrangement is such that there is provided a plurality of flow paths for the crushed glass particles from the bins 48, through the pipes 80, the elbows 81, the conduits 82 and the pipes 85 to the source of heat within the draft tube.

Crushed glass particles are fed at a uniform rate from the feeding unit 40 (FIG. 2), the elevator 41 and the helical screw conveyor 42 to the continuously rotating feed conduit 65. The particles flow by gravity through the conduit 65 and out the laterally extending portion 67 in an uninterrupted stream. As the conduit rotates, the portion 67 is successively positioned over each of the bins 48 within the receptacle 47. The particles are evenly distributed among the bins and are uniformly divided among the upper or inlet ends of each of the upstanding pipes 80.

The thus distributed particles flow downwardly through the pipes 80 and into the upstanding conduits 82. As the particles pass through the conduits 82, they are preheated in a manner more fully described in the Arthur G. Nylander U.S. patent application Ser. No. 712,186 entitled "Apparatus and Method for Producing Glass Beads" filed concurrently herewith. The particles then flow through the angularly disposed pipes 85 and into the draft tube 11. The particles are discharged from the pipes 85 in a uniform cloud which is precisely located with respect to the burners 13. The particles are then carried in an upward direction by the products of combustion to form glass beads in the manner described heretofore.

During normal operation, the level of particles within each of the bins 48 (FIG. 3) is maintained below the upper lip of the sleeve member 52. In the event that one or more of the upstanding conduits 82 or the pipes 80 or 85 becomes clogged, however, the level of particles within the corresponding bin increases, and the particles flow into the central section defined by the member 52. The particles then proceed along the pipe 79 to the lower portion of the furnace and spill onto the floor or into a suitable collection bin (not shown). The discharge of particles from the pipe 79 alerts the operator of the apparatus that a flow stoppage has taken place in one or more of the incoming streams, and the necessary steps may be taken to reopen the obstructed conduit or pipe and thus restore normal operation.

Although the invention has been described and illustrated as having particular utility in the feeding of crushed glass particles to the draft tube of a bead furnace, the apparatus also may be advantageously employed in other types of feeding equipment in which it is desired to supply accurate quantities of particles over a plurality of paths. As an illustration, the apparatus may be used to divide the crushed particles among a series of shifting machines or other sizing equipment, for example. Various other uses for the apparatus will suggest themselves to those skilled in the art upon a perusal of the foregoing disclosure.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. Apparatus for producing glass beads comprising, in combination, a vertical draft tube, heat source means disposed so as to direct heat into said draft tube, means including an expansion chamber communicating with and extending above said draft tube, a plurality of upstanding conduits having infeed and discharge ends, the discharge ends of said conduits being positioned within said draft tube immediately above the heat source means and in equi-distant relationship therewith, receptacle means including a plurality of bins supported in annular array above said expansion chamber, one of said bins being provided for each of said upstanding conduits and the inlet end of each conduit communicating with the corresponding bin, supply means containing crushed glass particles, elevator means for conveying particles from said supply means to a position above said receptacle means, a single feed conduit leading downwardly from said position to said receptacle means for supplying crushed glass particles thereto, said feed conduit having a laterally extending portion in juxtaposition with said bins, and means for continuously rotating said feed conduit within said receptacle means at a uniform rate, to successively position the laterally extending portion over each of said bins and thereby evenly distribute the crushed glass particles among the inlet ends of each of said upstanding conduits, the thus distributed particles flowing downwardly through each of said upstanding conduits and being discharged into said draft tube.

2. Apparatus for feeding particles of vitreous material to a source of heat, said apparatus comprising, in combination, heat source means, means defining a plurality of upstanding conduits having inlet and discharge ends, the discharge ends of said conduits being positioned immediately above the heat source means, receptacle means including a plurality of bins respectively communicating with the inlet ends of said conduits, supply means containing crushed particles of vitreous material, a single feed conduit leading from said supply means to said receptacle means for supplying crushed particles thereto, and means for continuously moving said feed conduit within said receptacle means to successively position the feed conduit over said bins and thereby distribute the particles among the inlet ends of each of said upstanding conduits, the thus distributed particles flowing along each of said upstanding conduits and being discharged immediately above said heat source means.

3. Apparatus as set forth in claim 2, said bins being arranged in an annular array in juxtaposition with said single feed conduit.

4. Apparatus for feeding particles of vitreous material comprising, in combination, a vertical draft tube, heat source means disposed so as to direct heat into said draft tube, means defining a plurality of flow paths having inlet and discharge ends, the discharge ends of said flow paths being positioned within said draft tube immediately adjacent the heat source means, receptacle means communicating with the inlet end of each of said flow paths, supply means containing crushed particles of vitreous material, a single feed conduit leading from said supply means to said receptacle means for supplying crushed particles thereto, and means for continuously moving said feed conduit within said receptacle means to successively position the feed conduit over the inlet ends of the flow paths and thereby distribute the particles among the inlet ends of each of said flow paths, the thus distributed particles flowing along each of said paths and being discharged into said draft tube.

5. Apparatus as set forth in claim 4, in which said single feed conduit includes a first portion having a vertical axis and a second, laterally extending portion in juxtaposition with said receptacle means, said feed conduit being continuously rotated about said vertical axis by said moving means to successively position said laterally extending portion over the inlet ends of said flow paths.

6. Apparatus as set forth in claim 4, in which said receptacle means comprises a plurality of bins respectively communicating with the inlet ends of said flow paths.

7. Apparatus as set forth in claim 4, in which the discharge ends of said flow paths are disposed in equidistant relationship with said heat source means.

8. Apparatus for producing glass beads comprising, in combination, a vertical draft tube, heat source means disposed so as to direct heat into said draft tube, means including an expansion chamber communicating with and extending above said draft tube, means defining a plurality of flow paths having inlet and discharge ends, the discharge ends of said flow paths being positioned within said draft tube immediately adjacent the heat source means, receptacle means communicating with the inlet end of each of said flow paths, supply means containing crushed glass particles, a single feed conduit leading from said supply means to said receptacle means for supplying crushed glass particles thereto, and means for continuously moving said feed conduit within said receptacle means to successively position the feed conduit over the inlet ends of the flow paths and thereby distribute the particles among the inlet ends of each of said flow paths, the thus distributed particles flowing along each of said paths and being discharged into said draft tube.

9. Apparatus for producing glass beads comprising, in combination, a vertical draft tube, heat source means disposed so as to direct heat into said draft tube, means including an expansion chamber communicating with and extending above said draft tube, a plurality of upstanding conduits having infeed and discharge ends, the discharge ends of said conduits being positioned within said draft tube immediately above the heat source means, receptacle means supported above said expansion chamber, the inlet end of each of said upstanding conduits communicating with said receptacle means, supply means containing crushed glass particles, a single feed conduit leading from said supply means to said receptacle means for supplying crushed glass particles thereto, and means for continuously moving said conduit within said receptacle means to successively position the feed conduit over the inlet ends of the upstanding conduits and thereby distribute the crushed glass particles among the inlet ends of each of said upstanding conduits, the thus distributed particles flowing downwardly through each of said upstanding conduits and being discharged into said draft tube.

10. Apparatus for producing glass beads comprising, in combination, a vertical draft tube, heat source means disposed so as to direct heat into said draft tube, means including an expansion chamber communicating with and extending above said draft tube, a plurality of upstanding conduits having infeed and discharge ends, the discharge ends of said conduits being positioned within said draft tube immediately above the heat source means and in equi-distant relationship therewith, receptacle means including a plurality of bins supported above said expansion chamber, one of said bins being provided for each of said upstanding conduits and the inlet end of each conduit communicating with the corresponding bin, supply means containing crushed glass particles, a single feed conduit leading from said supply means to said receptacle means for supplying crushed glass particles thereto, and means for continuously moving said feed conduit within said receptacle means at a uniform rate to successively position the feed conduit over the inlet ends of the upstanding conduits and thereby evenly distribute the crushed glass particles among the inlet ends of each of said upstanding conduits, the thus distributed particles flowing downwardly through each of said upstanding conduits and being discharged into said draft tube.

11. Apparatus for feeding crushed glass particles to a glass bead furnace having a vertical draft tube, heat source means disposed so as to direct heat into said draft tube and means including an expansion chamber communicating with and extending above said draft tube, said apparatus comprising, in combination, a plurality of upstanding conduits having infeed and discharge ends, the discharge ends of said conduits being positioned within said draft tube immediately adjacent the heat source means and in equi-distant relationship therewith, receptacle means including a plurality of bins supported above said expansion chamber, one of said bins being provided for each of said upstanding conduits and the inlet end of each conduit communicating with the corresponding bin, supply means containing crushed glass particles, a single feed conduit leading from said supply means to said receptacle means for supplying crushed glass particles thereto, said feed conduit having a laterally extending portion in juxtaposition with said bins, and means for successively positioning the laterally extending portion over each of said bins to distribute the crushed glass particles among the inlet ends of each of said upstanding conduits, the thus distributed particles flowing downwardly through each of said upstanding conduits and being discharged into said draft tube.

12. Apparatus as set forth in claim 11, said bins being arranged in annular array about a vertical axis, the laterally extending portion of said feed conduit being continuously rotated about said vertical axis by said moving means to distribute the crushed glass particles among said upstanding conduits.

13. Apparatus for producing glass beads comprising, in combination, a vertical draft tube, heat source means disposed so as to direct heat into said draft tube, means including an expansion chamber communicating with and extending above said draft tube, a plurality of upstanding conduits having infeed and discharge ends, the discharge ends of said conduits being positioned within said draft tube immediately above the heat source means and in equi-distant relationship therewith, receptacle means including a plurality of bins supported above said expansion chamber, one of said bins being provided for each of said upstanding conduits and the inlet end of each conduit communicating with the corresponding bin, supply means containing crushed glass particles, elevator means for conveying particles from said supply means to a position above said receptacle means, a single feed conduit leading downwardly from said position to said receptacle means for supplying crushed glass particles thereto, and means for continuously moving said feed conduit within said receptacle means at a uniform rate to successively position the feed conduit over said bins and thereby evenly distribute the crushed glass particles among the inlet ends of each of said upstanding conduits, the thus distributed particles flowing downwardly through each of said upstanding conduits and being discharged into said draft tube.

References Cited

UNITED STATES PATENTS

| | | | |
|---|---|---|---|
| 402,049 | 4/1889 | Wilcox | 209—149 |
| 2,334,578 | 11/1943 | Potters | 65—142 |
| 2,619,776 | 12/1952 | Potters | 65—21 |
| 2,945,326 | 7/1960 | Wood | 65—21 |
| 3,097,832 | 7/1963 | Murdock | 65—142 |

S. LEON BASHORE, Primary Examiner

R. L. LINDSAY, JR., Assistant Examiner

U.S. Cl. X.R.

65—21; 209—254, 498; 221—68; 222—478; 264—15